G. D. BURTON.
APPARATUS FOR TREATING SUGAR CANE AND SIMILAR SUBSTANCES.
APPLICATION FILED OCT. 17, 1906. RENEWED APR. 7, 1910.
976,779.
Patented Nov. 22, 1910.
2 SHEETS—SHEET 1.
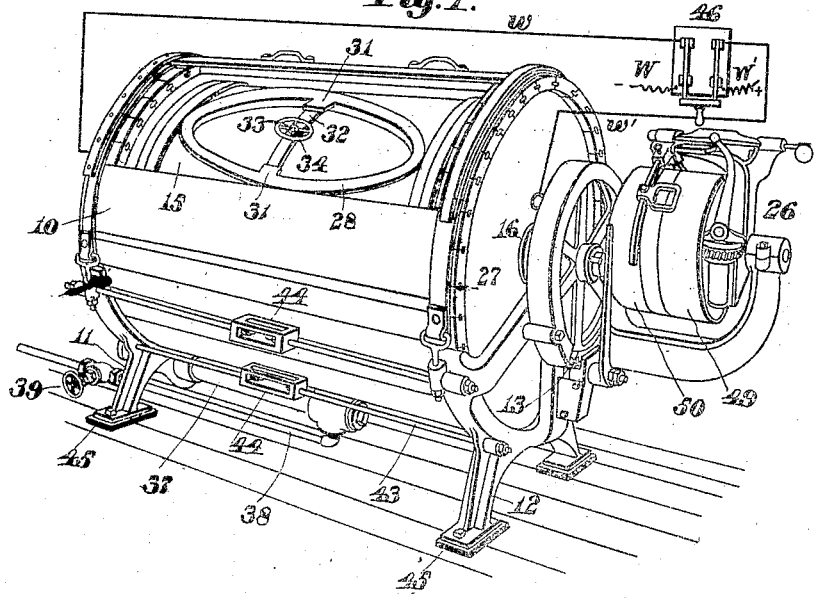
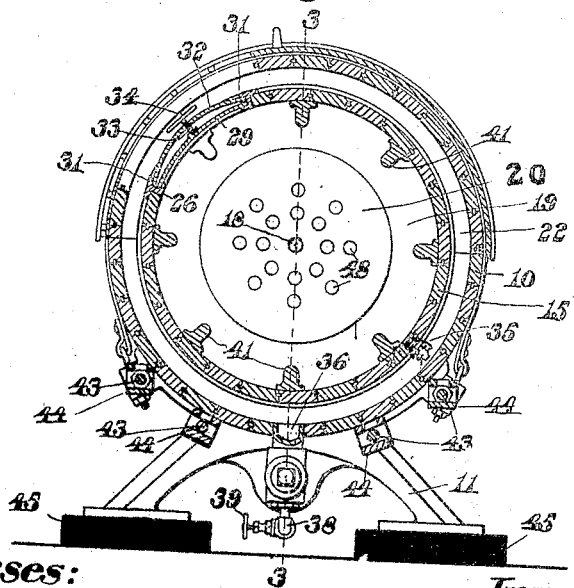
Witnesses:
Nathan C. Lombard
Howard Hanscom
Inventor:
George D. Burton,
by Walter E. Lombard,
Atty.

G. D. BURTON.
APPARATUS FOR TREATING SUGAR CANE AND SIMILAR SUBSTANCES.
APPLICATION FILED OCT. 17, 1906. RENEWED APR. 7, 1910.

976,779.

Patented Nov. 22, 1910.

2 SHEETS—SHEET 2.

Witnesses:
Nathan C. Lombard
Howard Hanscom

Inventor:
George D. Burton,
by Walter E. Lombard,
Atty.

UNITED STATES PATENT OFFICE.

GEORGE D. BURTON, OF BOSTON, MASSACHUSETTS.

APPARATUS FOR TREATING SUGAR-CANE AND SIMILAR SUBSTANCES.

976,779. Specification of Letters Patent. Patented Nov. 22, 1910.

Application filed October 17, 1906, Serial No. 339,336. Renewed April 7, 1910. Serial No. 554,041.

*To all whom it may concern:*

Be it known that I, GEORGE D. BURTON, a citizen of the United States of America, and a resident of Boston, in the county of Suffolk and State of Massachusetts, have invented certain new and useful Improvements in Apparatus for Treating Sugar-Cane and Similar Substances, of which the following is a specification.

This invention relates to apparatus for treating various substances in a solution containing acids or chemical salts by thoroughly agitating the substances through the revolution both in one direction and then in the other of the receptacle in which the substances are contained and subjecting said substances during this agitation to the action of a current of electricity.

One of the primary objects of the invention is to secure the gas or gases such for instance as hydrogen and oxygen gases or chlorin gas generated by the action of electricity upon the solution and substances contained within the revoluble tank and confine the same in a suitable receptacle so that the same may be utilized for various commercial purposes.

The invention consists in certain novel features of construction and arrangement of parts which will be readily understood by reference to the description of the drawings and to the claims hereinafter given.

Figure 3:
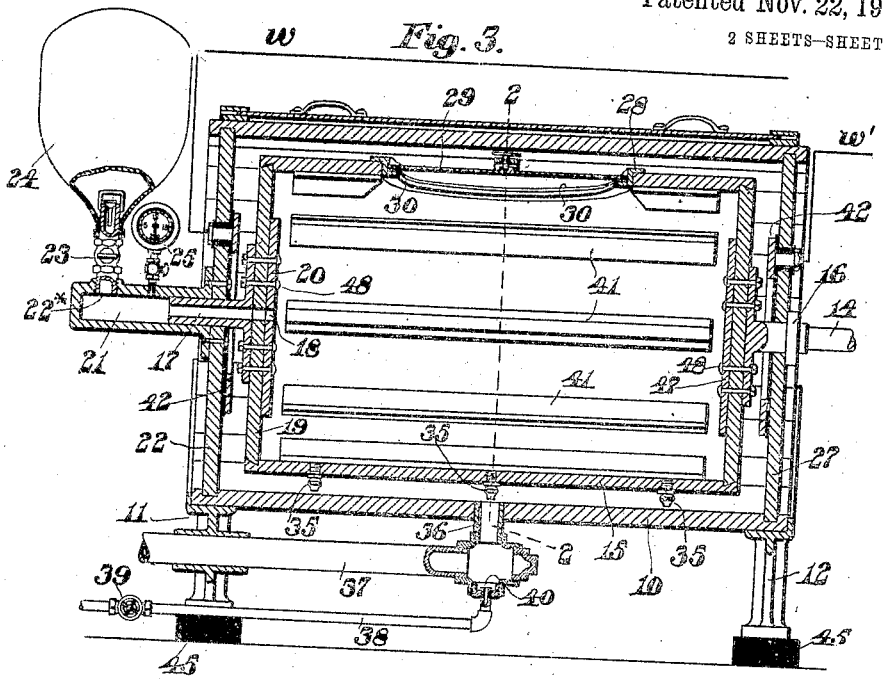
Figure 4:
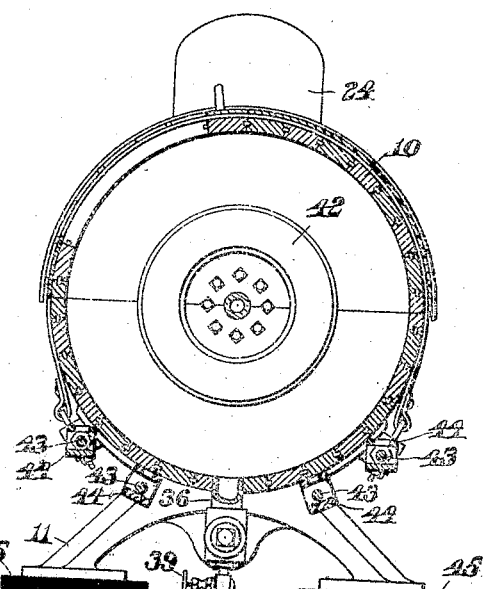

Of the drawings: Figure 1 represents a perspective view of an apparatus embodying the features of this invention. Fig. 2 represents a vertical section of the same, the cutting plane being on line 2—2 on Fig. 3. Fig. 3 represents a vertical longitudinal section, the cutting plane being on line 3—3 on Fig. 2, and Fig. 4 represents a similar section on Fig. 2 with the inner receptacle removed.

Similar characters designate like parts throughout the several figures of the drawings.

The apparatus consists of a stationary barrel-shaped tank 10 mounted upon castings or other suitable supports 11—12. The casting or support 12 serves also as a frame for supporting the driving mechanism, which includes a spur gear 13 mounted upon a trunnion 14 secured to one end of a revoluble receptacle 15 contained within said tank 10. The trunnion 14 is mounted in a suitable bearing 16 secured to the outer face of the tank 10. The opposite head of the revoluble receptacle 15 is provided with a tubular trunnion 17 secured to the outer face thereof and communicating with an opening 18 extending through the head 19 of said revoluble receptacle 15 and an electrode 20 secured to the inner face of said head. The trunnion 17 is adapted to rotate in a hollow bearing 21 secured to the outer face of the head 22 of the tank 10.

The pipe 21 is provided with an outlet 22* in which is located a valve 23, said outlet 22* having secured to its outer end a flexible bag or receptacle 24. The bearing 21 is also provided with a pressure gage 25 which operates in any well-known manner. The spur gear 13 is driven by means of suitable driving and reversing mechanism 26. This driving and reversing mechanism is of any well-known construction and is arranged to cause the revoluble receptacle 15 to turn in one direction from two to eight rotations, more or less, and then reverse automatically and turn from two to eight times, more or less, in the opposite direction.

The tank 10 is made in two sections, the heads 22 and 27 being divided horizontally (see Fig. 4) one-half of the staves being fastened to the lower sections of the heads and the other half to the upper sections of the heads so that the upper half of the tank 10 may be removed to allow of the placing in its position of the revoluble receptacle 15. The revoluble receptacle or cylinder 15 is provided with an opening in the peripheral wall thereof, this opening being provided with an annular flanged rim 28 set therein. Fitting the depressed portion of said annular rim 28 is a closure 29 and interposed between said closure 29 and the rim 28 is a rubber gasket 30.

The rim 28 is provided with inwardly projecting ears 31 with which a diametrical member 32 is adapted to co-act. This member 32 is provided with a threaded member or shank 33 having a handle 34 on the outer end thereof. When the closure 29 is placed within the inner wall of the rim 28 and resting upon the lower inwardly projecting flange thereof and the member 32 is placed beneath the ears 31, a few turns of the member 33 will securely clamp the closure in position and prevent leakage from the inner receptacle. Diametrically opposite the closure 29, the receptacle 15 is provided with a plurality of valved outlets 35 through which the contents of the inner receptacle may be drawn off.

The tank 10 is provided with an inlet nozzle 36 extending vertically into the bottom thereof and this inlet 36 communicates with a horizontal pipe 37 through which a suitable solution may be supplied to said tank or drawn therefrom as desired. A steam pipe 38 provided with a valve 39 communicates with the inlet 36 at 40, said steam inlet being in axial alinement with the solution inlet 36. When the solution settles in the bottom of the tank and tends to clog the supply inlet by operating the valve 39 a desired amount of steam may be discharged from said nozzle 40 to remove the obstruction from the inlet 36. This discharge of steam may continue during the entire operation or be made at intervals as desired. The revoluble receptacle 15 is provided with a plurality of inwardly projecting members 41 which serve as agitators and cause the contents of the cylinder to be thoroughly mixed during the revolution of said receptacle. At either end of the tank 10 is secured an annular electrode 42 surrounding the trunnions 14—17. These electrodes 42 are connected to the inner face of the heads 22—27 of said tank and are connected on the outer face of said tank with the service wires $w$, $w'$.

The end castings 11—12 are connected to each other by bolts 43 connected midway between the heads of said receptacles by insulating members 44 of any ordinary construction, while said end castings or supports 11—12 are mounted upon insulating plates 45 to prevent the current from passing to the floor of the building in which the apparatus is housed. A switch 46 of any ordinary construction is used for connecting the service lines W, W' with the apparatus.

The revoluble receptacle 15 has the inner face of each of its heads provided with suitable electrodes 20 and 47 secured thereto by means of a plurality of bolts 48 passing through said head. The pipe 37 is provided with a suitable valve (not shown) and when it is desired to treat any substances in the apparatus a suitable solution is passed through said pipe into said tank filling the same to a point just below the trunnions. This solution may be provided with various chemical salts, acids, or other agents adapted to act upon the various substances being treated, the solution necessarily varying with the substances being treated and the object to be attained.

When a sufficient quantity of solution has been supplied to the tank the valve is shut off. This solution may be heated by opening the valve 39 and supplying steam to the tank. The apparatus is then set in motion by means of a suitable belt (not shown) communicating with the fast and loose pulleys 49—50 so that the inner receptacle 15 is rotated first in one direction and then in another by the automatic reversing mechanism 26. The switch 46 is then closed to cause a current of electricity to pass to one of the electrodes 42. The current passing to one of these electrodes 42 will pass through the solution contained within the tank 10 and through the bolts 48 into one of the electrodes 47. The inner receptacle is provided with a suitable solution in which the articles or substances to be treated are immersed and this solution is provided with a sufficient quantity of chemical salts such as chlorid of sodium or its equivalent for the purpose of increasing the gravity of the solution, thereby affording increased conductance to the same sufficient to cause an electric current to more advantageously act. The electric current passes from one electrode 47 through the substances immersed to the other electrode 47 and then through the bolts 48 and the solution in the outer tank 10 to the other electrode 42 and from this to the service wire $w$.

The resistance to the current of electricity in the solution is sufficient to cause the current to pass through the substances contained therein and in so doing acts upon the substances contained within the inner receptacle in various manners, depending on the nature of the solution and the articles or substances immersed therein.

The current of electricity which passes through the solution is of a volume and pressure varying in voltage and amperage from fifty to five hundred volts, more or less, and from one and one-half to three hundred amperes, more or less, according to the size of the treating receptacle and the quantity of the substances or articles being treated.

In the operation upon various substances in an inclosed tank such as is herein described the chemical and electrical action upon the substances is such as to produce an amount of gas or gases which has to be cared for in some manner or else an explosion might occur. It is obvious that the gas thus produced may be utilized for various commercial purposes if collected and the receptacle 24 affords a ready means of collecting the gas produced in the receptacle 15.

It is believed that from the foregoing the operation of the invention will be thoroughly understood without any further description.

Claims.

1. In an apparatus of the class described, the combination of a revoluble receptacle provided with mixing devices, an electrode at each end thereof, a tank in which said receptacle is revolved, means for connecting said electrodes in an electric circuit, an annular flanged rim set into an opening in said revoluble member, a closure therefor, and means for clamping said closure to said rim.

2. In an apparatus of the class described, the combination of a revoluble receptacle provided with mixing devices, an electrode at each end thereof, a tank in which said receptacle is revolved, means for connecting said electrodes in an electric circuit, an annular flanged rim set into an opening in said revoluble member, and provided with inwardly projecting ears, a closure therefor, a member adapted to co-act with said ears, and a rotatable member threaded thereto adapted to clamp said closure to said rim.

3. In an apparatus of the class described, the combination of a revoluble receptacle provided with mixing devices, an electrode at each end thereof, a tank in which said receptacle is revolved, an annular electrode on the inner face of either end of said tank and surrounding the axis of said revoluble member, and means for connecting said electrodes in an electric circuit.

4. In an apparatus of the class described, the combination of a revoluble receptacle provided with mixing devices, an electrode at each end thereof, a tank in which said receptacle is revolved, an electrode on the inner face of each of the heads of said tank, means for connecting said electrodes in an electric circuit, a closure for said revoluble receptacle, and a plurality of valved outlets for said receptacle.

5. In an apparatus of the class described, the combination of a revoluble receptacle provided with mixing devices, an electrode at each end thereof, a tank in which said receptacle is revolved, an electrode on the inner face of each of the heads of said tank, means for connecting said electrodes in an electric circuit, a closure for said revoluble receptacle, and a plurality of valved outlets for said receptacle diametrically opposite said closure.

6. In an apparatus of the class described, the combination of a revoluble receptacle provided with mixing devices, an electrode at each end thereof, means for connecting said electrodes in an electric circuit, a tank in which said receptacle is revolved, a hollow bearing on the end of said tank having a closed end and provided with an outlet therefrom, a tubular trunnion secured to said revoluble receptacle and revoluble within said bearing, and a valve in the outlet to said bearing.

7. In an apparatus of the class described, the combination of a revoluble receptacle provided with mixing devices, an electrode at each end thereof, means for connecting said electrodes in an electric circuit, a tank in which said receptacle is revolved, a hollow bearing on the end of said tank having a closed end and provided with an outlet therefrom, a tubular trunnion secured to said revoluble receptacle and revoluble within said bearing, a receptacle secured to the outlet of said bearing, and a valve in the outlet to said bearing.

8. In an apparatus of the class described, the combination of a revoluble receptacle provided with mixing devices, an electrode at each end thereof, means for connecting said electrodes in an electric circuit, a tank in which said receptacle is revolved, a hollow bearing provided with an outlet on one end of said tank, a tubular trunnion secured to said revoluble receptacle and revoluble within said bearing, a receptacle secured to the outlet of said bearing, and a valve interposed between said receptacle and said hollow bearing.

9. In an apparatus of the class described, the combination of a revoluble receptacle provided with mixing devices, an electrode at each end thereof, means for connecting said electrodes in an electric circuit, a tank in which said receptacle is revolved, a hollow bearing having a closed outer end on one end of said tank, a tubular trunnion secured to said revoluble receptacle and revoluble within said bearing, and a pressure gage communicating with the interior of said bearing and adapted to denote the pressure within said revoluble receptacle.

10. In an apparatus of the class described, the combination of a revoluble receptacle provided with mixing devices, an electrode at each end thereof, means for connecting said electrodes in an electric circuit, a tank in which said receptacle is revolved, a pipe communicating with said tank adapted to supply the same with a suitable solution, and another pipe communicating with said tank for supplying steam thereto.

11. In an apparatus of the class described, the combination of a revoluble receptacle provided with mixing devices, an electrode at each end thereof, means for connecting said electrodes in an electric circuit, a tank in which said receptacle is revolved, a pipe communicating with said tank adapted to supply the same with a suitable solution, and a steam pipe communicating with said tank at the opening through which said solution is supplied thereto.

12. In an apparatus of the class described, the combination of a revoluble receptacle provided with mixing devices, an electrode at each end thereof, means for connecting said electrode in an electric circuit, a tank in which said receptacle is revolved, a vertical inlet pipe communicating with said tank, a horizontal pipe for the admission of the solution connected with said vertical inlet pipe, and a steam nozzle in said vertical inlet pipe and in axial alinement therewith.

13. In an apparatus of the class described, the combination of a revoluble receptacle, an electrode at each end thereof, means for connecting said electrodes in an electric circuit, a tank in which said receptacle is revolved, a pipe communicating with said tank adapted to supply the same with a suitable solution, and means for receiving and confining the escaping gases generated from the solution and substances being treated.

14. In an apparatus of the class described, the combination of a receptacle, electrodes therein, means for connecting the electrodes in an electric circuit, a pipe adapted to supply said receptacle with a suitable solution, and a flexible bag detachably secured to the outlet from said receptacle for receiving and confining the escaping gases generated from the solution and substances being treated.

Signed by me at Boston, Massachusetts, this 15th day of October, 1906.

GEO. D. BURTON.

Witnesses:
WALTER E. LOMBARD,
EDNA C. CLEVELAND.